(12) United States Patent
Federowicz et al.

(10) Patent No.: US 11,387,640 B1
(45) Date of Patent: Jul. 12, 2022

(54) ELECTRICAL RECEPTACLE BOX CONSTRUCTION

(71) Applicants: Michael Federowicz, East Providence, RI (US); Michelle Laramee, Smithfield, RI (US)

(72) Inventors: Michael Federowicz, East Providence, RI (US); Michelle Laramee, Smithfield, RI (US)

(73) Assignee: RIOK Enterprises LLC, Smithfield, RI (US)

( * ) Notice: Subject to any disclaimer, the term of this patent is extended or adjusted under 35 U.S.C. 154(b) by 0 days.

(21) Appl. No.: 17/223,186

(22) Filed: Apr. 6, 2021

(51) Int. Cl.
*H02G 3/00* (2006.01)
*H02G 3/18* (2006.01)
*H02G 3/12* (2006.01)

(52) U.S. Cl.
CPC .............. *H02G 3/18* (2013.01); *H02G 3/125* (2013.01)

(58) Field of Classification Search
CPC ................................. H02G 3/18; H02G 3/125
See application file for complete search history.

(56) References Cited

U.S. PATENT DOCUMENTS

| | | | |
|---|---|---|---|
| 2,050,132 A | 8/1936 | Spiegel | |
| 3,601,276 A | 8/1971 | Culpepper | |
| 3,633,782 A | 1/1972 | Bellinger | |
| 4,403,708 A | 9/1983 | Smolik | |
| 4,483,453 A | 11/1984 | Smolik | |
| 4,497,416 A | 2/1985 | Smolik | |
| 4,576,302 A | 3/1986 | Smolik | |
| 4,599,485 A | 7/1986 | Smolik | |
| 5,839,594 A * | 11/1998 | Barbour | H02G 3/22 220/3.7 |
| 6,102,229 A * | 8/2000 | Moncourtois | H02G 3/285 220/3.9 |
| 6,278,062 B1 | 8/2001 | Sowdon | |
| 6,435,727 B1 * | 8/2002 | Fingler | G02B 6/3897 385/139 |
| 7,098,399 B1 * | 8/2006 | Gretz | H02G 3/12 174/53 |
| 7,173,186 B1 * | 2/2007 | Hageman | H02G 3/125 174/57 |
| 7,939,755 B1 * | 5/2011 | Sapio | H02G 3/126 174/64 |
| 8,899,431 B1 * | 12/2014 | Shotey | H02G 3/086 220/4.03 |

* cited by examiner

*Primary Examiner* — Pete T Lee
(74) *Attorney, Agent, or Firm* — Salter & Michaelson

(57) ABSTRACT

An electrical receptacle box apparatus, in combination with a wall structure that includes an upright wall stud. The electrical receptacle box apparatus is constructed and arranged for securing to the upright wall stud. The wall structure forms a barrier that defines and demarcates adjacent rooms. The electrical receptacle box apparatus includes an electrical receptacle box having oppositely facing first and second component securing surfaces and a mounting surface, fasteners for securing the electrical receptacle box to the wall stud by securing the mounting surface of the electrical receptacle box to a side surface of the wall stud, a first electrical component positioned within the electrical receptacle box at the first component securing surface of the electrical receptacle box, and a second electrical component positioned within the electrical receptacle box at the second component securing surface of the electrical receptacle box.

20 Claims, 7 Drawing Sheets

ELECTRICAL RECEPTACLE BOX CONSTRUCTION

FIELD OF THE INVENTION

The present invention relates in general to an electrical receptacle box construction, and pertains more particularly to an electrical receptacle box apparatus constructed and arranged for securing to an upright wall stud that forms part of a wall structure that demarcates adjacent room.

BACKGROUND OF THE INVENTION

At the present time when electricians are roughing out for the installation of electrical receptacle boxes for various rooms, many times they are using multiple electrical receptacle boxes without taking into consideration parts cost, labor and aesthetics. The use of too many receptacle boxes causes the drywallers to make more cuts in the sheet rock which also increases labor costs.

Accordingly, the objective of the present invention is to solve this problem by essentially doubling the depth of the receptacle box to allow switches, dimmers and any other electrical components the capability of being installed symmetrically.

Another objective of the present invention is to provide an electrical receptacle box apparatus constructed and arranged for securing to an upright wall stud that forms part of a wall structure that demarcates adjacent room areas.

Still another objective of the present invention is to avoid the need for additional parts and labor to install those parts as well as the need for additional sheet rock cuts.

SUMMARY OF THE INVENTION

To accomplish the objectives of the present invention there is provided an electrical receptacle box apparatus constructed and arranged for securing to an upright wall stud that forms part of a wall structure that demarcates adjacent room. The electrical receptacle box apparatus comprises an electrical receptacle box having oppositely facing first and second component securing surfaces and a mounting surface, fasteners for securing the electrical receptacle box to the wall stud by securing the mounting surface of the electrical receptacle box to a side surface of the wall stud, a first electrical component positioned within the electrical receptacle box at the first component securing surface of the electrical receptacle box, and a second electrical component positioned within the electrical receptacle box at the second component securing surface of the electrical receptacle box.

In accordance with other aspects of the present invention any one of either the first or second electrical components is any one of a switch, dimmer and plug; the electrical receptacle box is constructed of one of metal and plastic; a depth of the electrical receptacle box is on the order of a depth of the wall stud; each of the first and second components is one of a switch, dimmer and plug; a depth of the electrical receptacle box is on the order of a depth of the wall stud; further including a first face plate for covering the first electrical component, and a second face plate for covering the second electrical component; the first and second electrical components are in linear alignment; and wherein the electrical receptacle box is constructed of one of metal and plastic; wherein a depth of the electrical receptacle box is on the order of a depth of the wall stud; wherein each of the first and second components is one of a switch, dimmer and plug; and further including a first face plate for covering the first electrical component, and a second face plate for covering the second electrical component.

In accordance with the objective of the present invention there is further provided an electrical receptacle box apparatus, in combination with a wall structure that includes an upright wall stud. The electrical receptacle box apparatus is constructed and arranged for securing to the upright wall stud. The wall structure forms a barrier that defines and demarcates adjacent rooms. The electrical receptacle box apparatus comprises an electrical receptacle box having oppositely facing first and second component securing surfaces and a mounting surface, fasteners for securing the electrical receptacle box to the wall stud by securing the mounting surface of the electrical receptacle box to a side surface of the wall stud, a first electrical component positioned within the electrical receptacle box at the first component securing surface of the electrical receptacle box, and a second electrical component positioned within the electrical receptacle box at the second component securing surface of the electrical receptacle box.

In accordance with still other aspects of the present invention any one of either the first or second electrical components is any one of a switch, dimmer and plug; the electrical receptacle box is constructed of one of metal and plastic; a depth of the electrical receptacle box is on the order of a depth of the wall stud; each of the first and second components is one of a switch, dimmer and plug; a depth of the electrical receptacle box is on the order of a depth of the wall stud; further including a first face plate for covering the first electrical component, and a second face plate for covering the second electrical component; the first and second electrical components are in linear alignment; and wherein the electrical receptacle box is constructed of one of metal and plastic; wherein a depth of the electrical receptacle box is on the order of a depth of the wall stud; wherein each of the first and second components is one of a switch, dimmer and plug; and further including a first face plate for covering the first electrical component, and a second face plate for covering the second electrical component.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 4 illustrated one way of mounting the electrical receptacle box using nails or the like;

DETAILED DESCRIPTION

Figure 1:
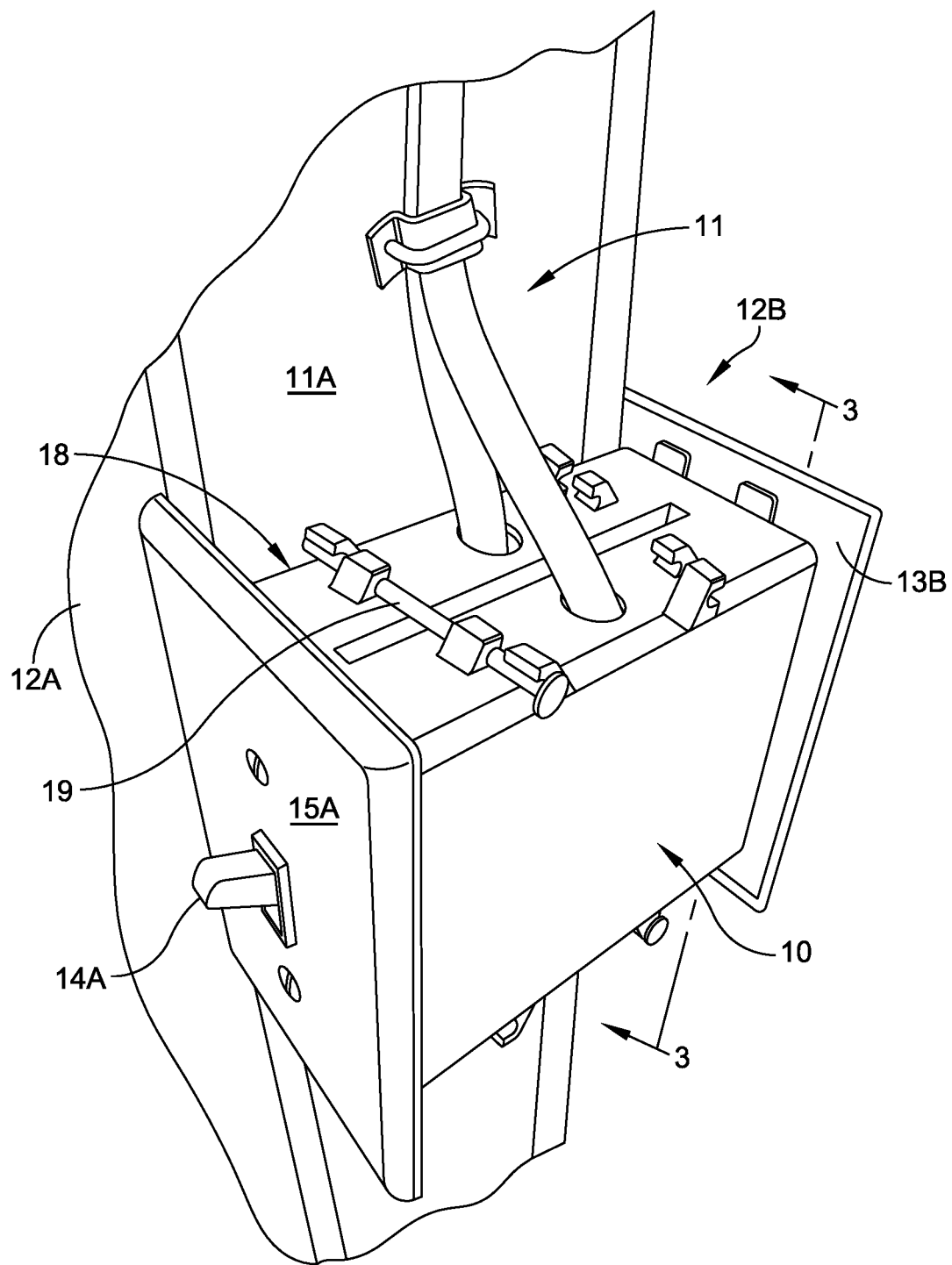
FIG. 1 is a perspective view of the electrical receptacle box construction of the present invention.

The electrical receptacle boxes of the present invention are designed so that switches, dimmers, plugs or anything that requires an electrical receptacle box can be wired and assembled symmetrically (aka back-to-back). This arrangement provides a pleasing aesthetic appearance where the same stud can be used for securing the deepened receptacle box. This arrangement provides a pleasing aesthetic look as well as being more economical when the installation and sheet rocking takes place. This metal or plastic electrical receptacle box can accommodate 1 to 4 (gangs) for switches, dimmers, plugs or anything that requires an electrical receptacle.

The electrical receptacle box is designed to attach to a stud, which is typically a 2×4 in residential and commercial dwellings. The width of the stud usually measures 3½ "wide in most cases. Sheet rock which comes typically used in interiors walls is ⅜" or ½" and ⅝" for FR board. So, the electrical receptacle box is designed so that the overall width of the box takes into consideration the width of the stud and the thickness of the sheet rock. The electrical receptacle box can be mounted in basically three different ways. It can be nailed to the stud or be attached by either a vertical tab or horizontal tab. Some of these means for mounting are illustrated in the drawings.

Figure 2:
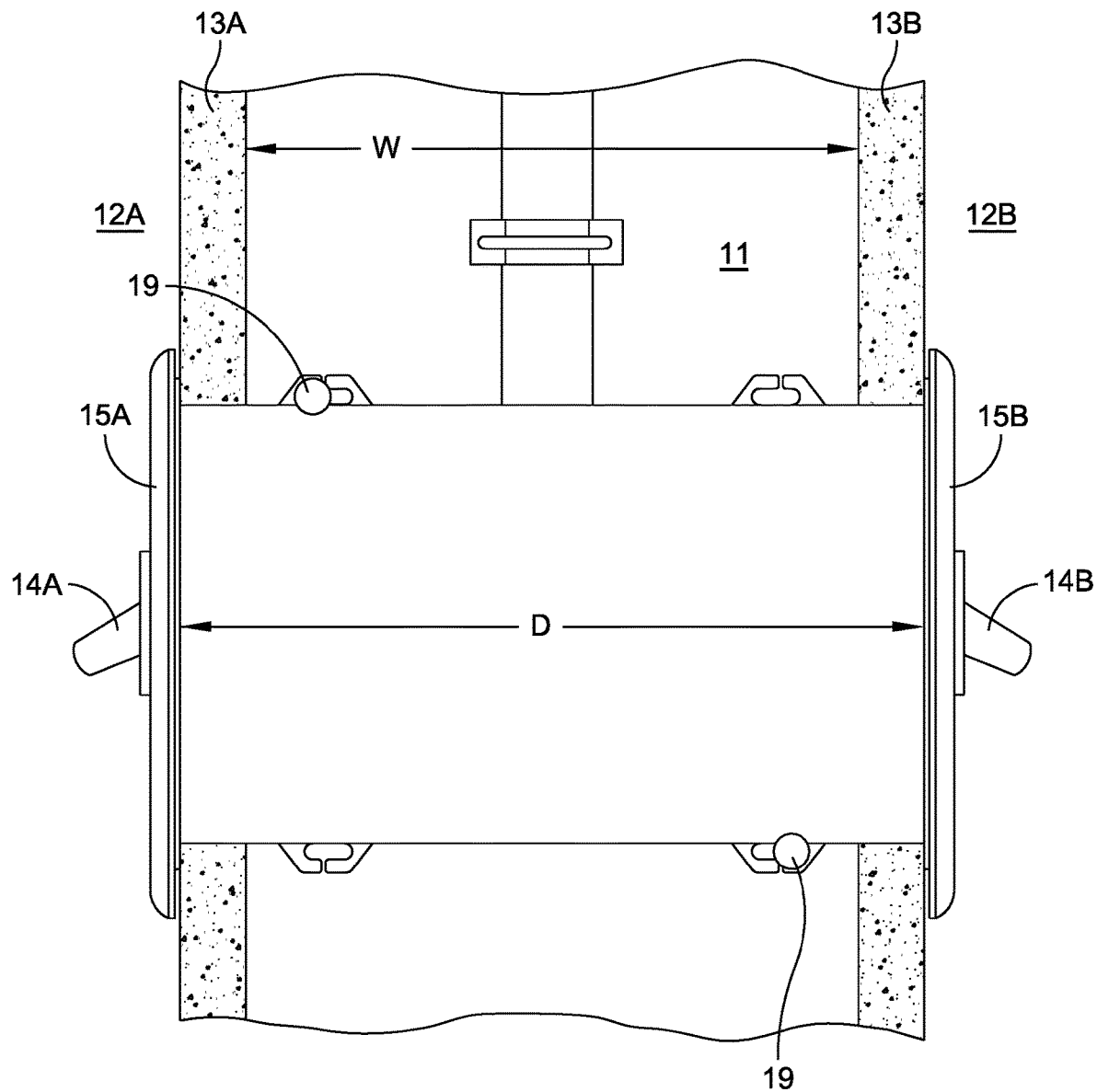
FIG. 2 is a side elevation view of the electrical receptacle box construction illustrated in FIG. 1.
Figure 3:
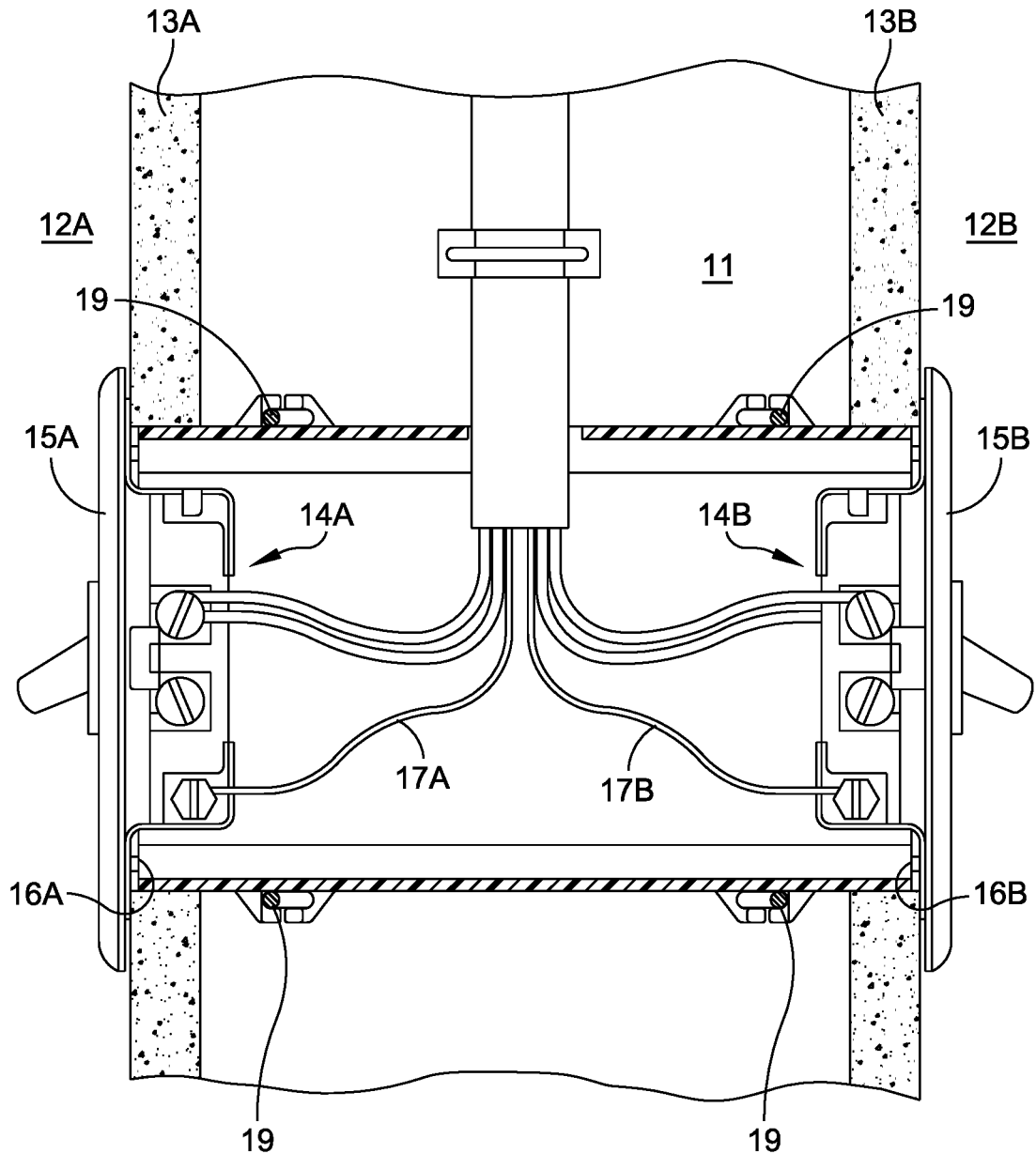
FIG. 3 is cross-sectional view taken along in 3-3 of FIG. 1 illustrating the embodiment using two electrical switches and associated wiring.

FIG. 1 is a perspective view of the electrical receptacle box construction of the present invention. FIG. 2 is a side elevation view of the electrical receptacle box construction illustrated in FIG. 1. FIG. 3 is cross-sectional view taken along in 3-3 of FIG. 1 illustrating the embodiment using two electrical switches and associated wiring.

To accomplish the objectives of the present invention there is provided an electrical receptacle box 10 that is constructed and arranged for securing to an upright wall stud 11. The wall stud 11 forms part of a wall structure that demarcates adjacent room areas indicated in FIGS. 1 and 2 at 12A and 12B.

The electrical receptacle box 10 as particularly noted in FIGS. 2 and 3 has a depth D (see FIG. 2) that is typically slightly wider than the width W (see FIG. 2). FIGS. 2 and 3 also illustrate the drywall at 13A and 13B.

In the embodiment illustrated in FIGS. 1-3 there are illustrated oppositely disposed switches 14A and 14B as well as switch face plate 15A and 15B. The switch mechanisms 14A, 14B may be mounted in a known way at opposite ends of the receptacle box indicated in FIG. 3 at 16A and 16B. FIG. 3 also illustrates wiring at 17A and 17B to the respective switch mechanisms 14A and 14B.

Thus, the electrical receptacle box has oppositely facing first and second component securing surfaces 16A, 16B as well as a mounting surface 18. Fasteners of some type are using for securing the electrical receptacle box to the wall study by securing the mounting surface 18 to a side surface 11A of the wall stud 11.

Thus, as illustrated in FIGS. 1-3, there is provided a first electrical component positioned within the electrical receptacle box at the first electrical component 14A securing surface 16A of the electrical receptacle box and a second electrical component 14B positioned within the electrical receptacle box at the second component securing surface 16B.

In accordance with other aspects of the present invention it is noted that any one of the first and second electrical components can be in many different forms including, but not limited to, a switch, dimmer or electrical plug. The electrical receptacle box 10 can be constructed of either metal or a plastic material. A depth D of the electrical receptacle box is slightly longer than the stud width W. For fasteners, to secure the receptacle box to the wall stud, in FIG. 1 there are provided nails 19.

Figure 5:
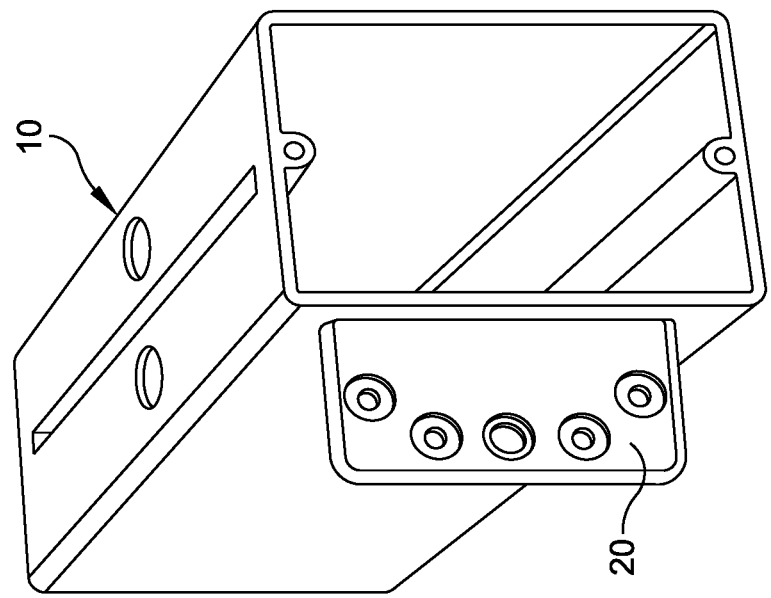
FIG. 5 illustrated another way of mounting the electrical receptacle box using a side tab.
Figure 4:
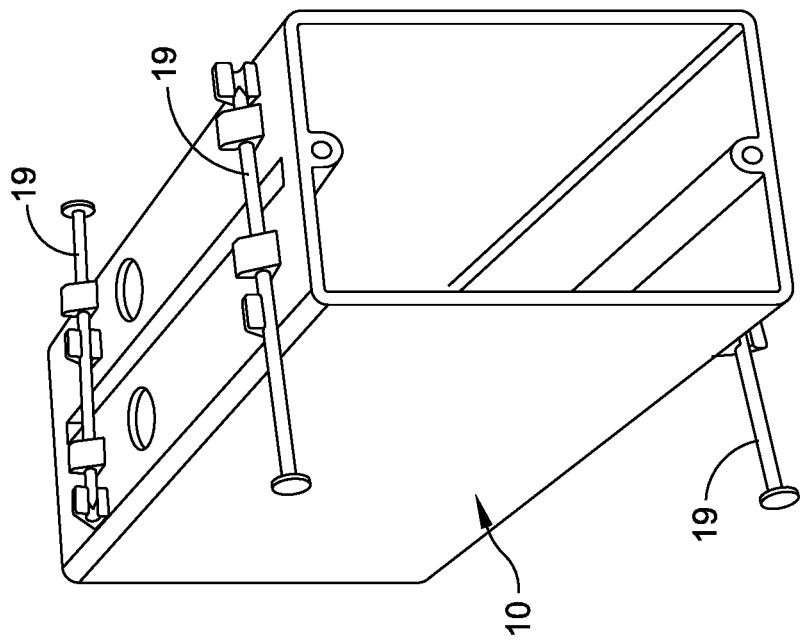
Figure 6:
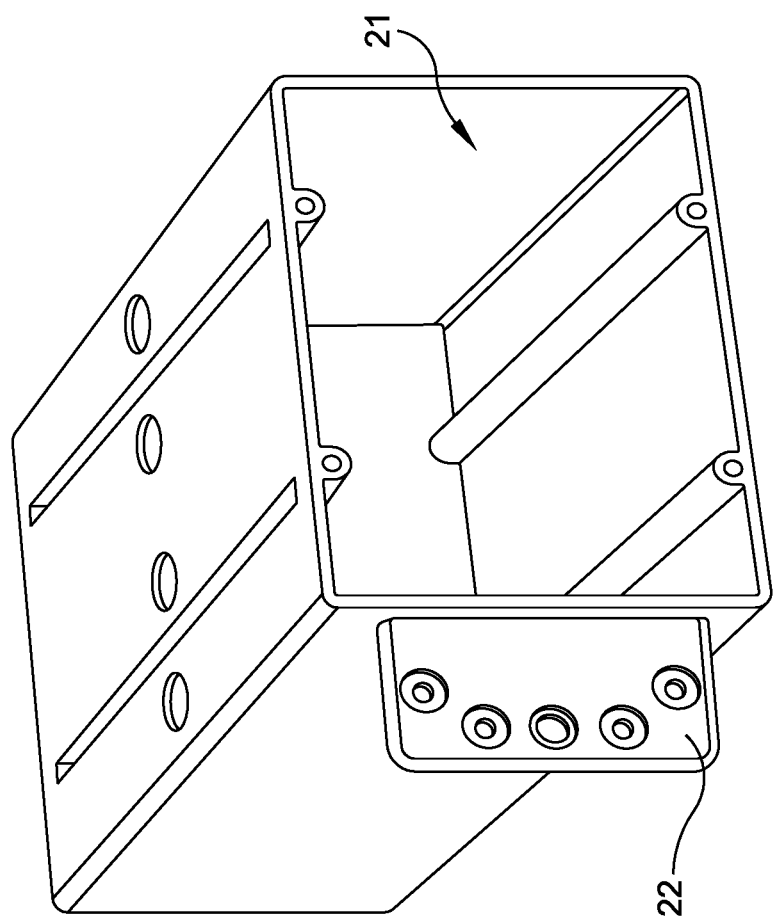
FIG. 6 illustrates the concepts of the present invention as applied to a dual ganged box.
Figure 8:
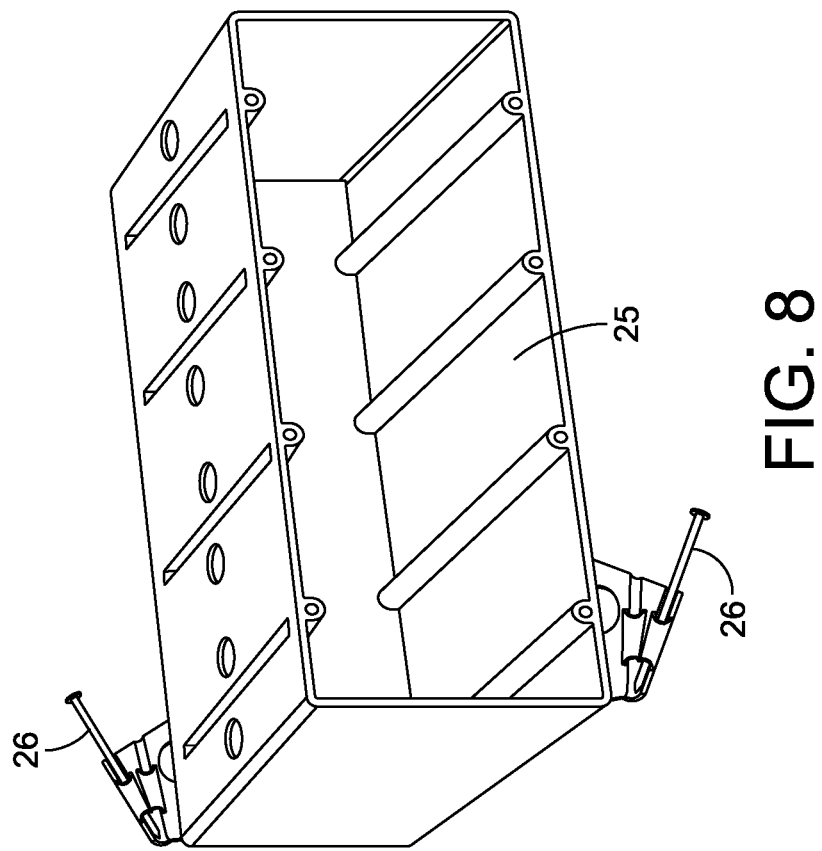
FIG. 8 illustrates the concepts of the present invention as applied to a four way ganged box.
Figure 7:
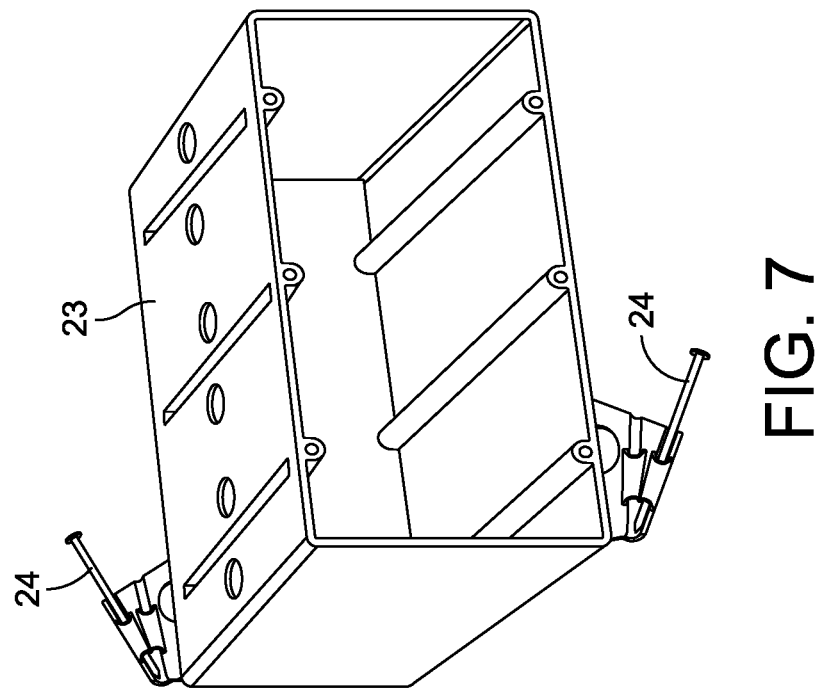
FIG. 7 illustrates the concepts of the present invention as applied to a three way ganged box.

FIG. 4 illustrates one way of mounting the electrical receptacle box using nails 19 or the like. FIG. 5 illustrates another way of mounting the electrical receptacle box using a side tab 20. FIG. 6 illustrates the concept of the present invention as applied to a dual ganged box 23. The mounting in FIG. 6 is by means of a side mounting tab 22. FIG. 7 illustrates the concepts of the present invention as applied to a three way ganged box 23. It is noted that the box 23 is secured by means of nails 24. FIG. 8 illustrates the concepts of the present invention as applied to a four way ganged box 25. It is noted that the box 23 is secured by means of nails 26.

Figure 9:
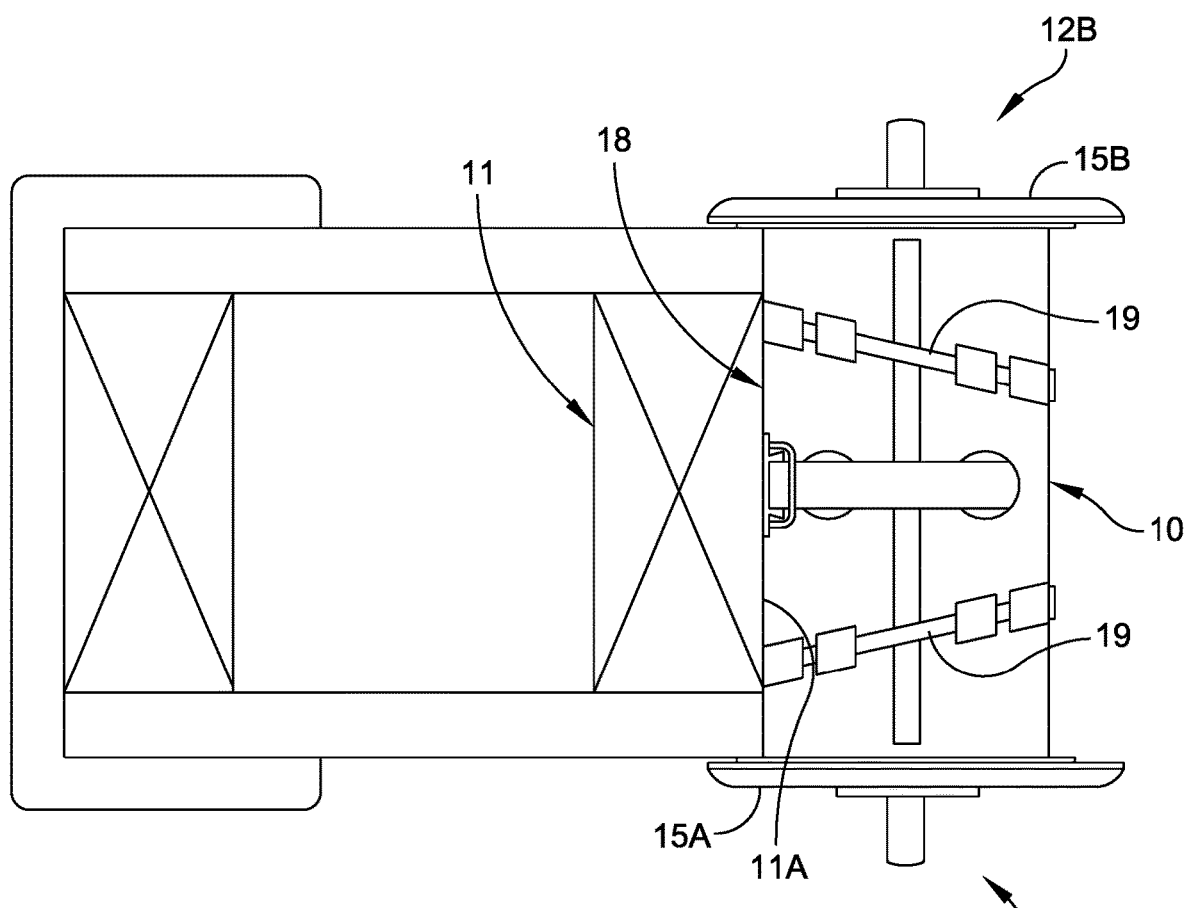
FIG. 9 is a schematic illustration showing the interface between a side surface of the electrical receptacle box and a side surface of the wall stud.

So that the arrangement of the receptacle box relative to the wall set is clear. Refer also to FIG. 9 that clearly illustrates the abutment of the surface 18 of the electrical receptacle box with the side surface 11A of the wall stud.

Having now described a limited number of embodiments of the present invention, it should now be apparent to those skilled in the art that numerous other embodiments and modifications thereof are contemplated as falling within the scope of the present invention, as defined by the appended claims. Although we have described the present invention as being secured to a wall stud, it is to be understood that the wall stud could be constructed of wood, metal or any other material. Furthermore, the stud may be one that is upright or may be positioned at different orientation.

What is claimed is:

1. An electrical receptacle box apparatus constructed and arranged for securing to a wall stud that forms part of a wall structure that demarcates adjacent rooms, said electrical receptacle box apparatus comprising an electrical receptacle box having oppositely facing first and second component securing surfaces and a mounting surface, fasteners for securing the electrical receptacle box to the wall stud by securing the mounting surface of the electrical receptacle box to a side surface of the wall stud, a first electrical component positioned within the electrical receptacle box at the first component securing surface of the electrical receptacle box, and a second electrical component positioned within the electrical receptacle box at the second component securing surface of the electrical receptacle box, wherein the electrical receptacle box is constructed of one of metal and plastic; wherein a depth of the electrical receptacle box is on the order of a depth of the wall stud; wherein each of the first and second components is one of a switch, dimmer and plug; and further including a first face plate for covering the first electrical component, and a second face plate for covering the second electrical component, wherein the fasteners are attached at both a top and bottom surface of the electrical receptacle box, wherein each of the top and bottom surface fasteners include an elongated fastener and a pair of fastener projections that are secured to the respective top and bottom surfaces, wherein the pair of fastener projections are spaced apart and receive and support the elongated fastener.

2. The electrical receptacle box apparatus of claim 1 wherein, at both the top and bottom surfaces of the electrical receptacle box, there is provided at least two fasteners each including an elongated fastener and a pair of fastener projections for receiving and supporting the respective elongated fastener.

3. The electrical receptacle box apparatus of claim 2 including wiring that extends into the electrical receptacle box.

4. The electrical receptacle box apparatus of claim 3 wherein the at least two fasteners are disposed in a same plane and substantially in parallel to each other.

5. The electrical receptacle box apparatus of claim 3 wherein the at least two fastener projection are disposed in a same plane and at an acute angle to each other.

6. The electrical receptacle box apparatus of claim 2 wherein there are four fastener projections for receiving and supporting each fastener.

7. The electrical receptacle box apparatus of claim 6 wherein all of the four fastener projections are spaced apart and are disposed in a linear array.

8. The electrical receptacle box apparatus of claim 7 wherein each fastener projection has an open port for receiving the fastener.

9. The electrical receptacle box apparatus of claim 8 wherein adjacent fastener projections face in opposite directions.

10. The electrical receptacle box apparatus of claim 1 wherein at either of the top and bottom surfaces of the electrical receptacle box, there is provided at least two fasteners each including an elongated fastener and a pair of fastener projections for receiving and supporting the respective elongated fastener.

11. An electrical receptacle box apparatus, in combination with a wall structure that includes a wall stud, wherein the electrical receptacle box apparatus is constructed and arranged for securing to the wall stud, the wall structure forming a barrier that defines and demarcates adjacent rooms, said electrical receptacle box apparatus comprising an electrical receptacle box having oppositely facing first and second component securing surfaces and a mounting surface, fasteners for securing the electrical receptacle box to the wall stud by securing the mounting surface of the electrical receptacle box to a side surface of the wall stud, a first electrical component positioned within the electrical receptacle box at the first component securing surface of the electrical receptacle box, and a second electrical component positioned within the electrical receptacle box at the second component securing surface of the electrical receptacle box, wherein the electrical receptacle box is constructed of one of metal and plastic; wherein a depth of the electrical receptacle box is on the order of a depth of the wall stud; wherein each of the first and second components is one of a switch, dimmer and plug; and further including a first face plate for covering the first electrical component, and a second face plate for covering the second electrical component, wherein the fasteners are attached at both a top and bottom surface of the electrical receptacle box, wherein each of the top and bottom surface fasteners include an elongated fastener and a pair of fastener projections that are secured to the respective top and bottom surfaces, wherein the pair of fastener projections are spaced apart and receive and support the elongated fastener.

12. The combination of claim 11; wherein, at both the top and bottom surfaces of the electrical receptacle box, there is provided at least two fasteners each including an elongated fastener and a pair of fastener projections for receiving and supporting the respective elongated fastener.

13. The combination of claim 12 including wiring that extends into the electrical receptacle box.

14. The combination of claim 13 wherein the at least two fasteners are disposed in a same plane and substantially in parallel to each other.

15. The combination of claim 13 wherein the at least two fastener projection are disposed in a same plane and at an acute angle to each other.

16. The combination of claim 12 wherein there are four fastener projections for receiving and supporting each fastener.

17. The combination of claim 16 wherein all of the four fastener projections are spaced apart and are disposed in a linear array.

18. The combination of claim 17 wherein each fastener projection has an open port for receiving the fastener.

19. The combination of claim 18 wherein adjacent fastener projections face in opposite directions.

20. The combination of claim 11 wherein, at either of the top and bottom surfaces of the electrical receptacle box, there is provided at leas two fasteners each including an elongated fastener and a pair of fastener projections for receiving and supporting the respective elongated fastener.

* * * * *